(12) United States Patent
Liu

(10) Patent No.: US 10,684,409 B2
(45) Date of Patent: Jun. 16, 2020

(54) BACKLIGHT MODULE AND LIQUID CRYSTAL DISPLAY DEVICE

(71) Applicant: WUHAN CHINA STAR OPTOELECTRONICS TECHNOLOGY CO., LTD., Wuhan (CN)

(72) Inventor: Zhongjie Liu, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/663,755

(22) PCT Filed: Apr. 18, 2017

(86) PCT No.: PCT/CN2017/080950
§ 371 (c)(1),
(2) Date: Jul. 30, 2017

(87) PCT Pub. No.: WO2018/166035
PCT Pub. Date: Sep. 20, 2018

(65) Prior Publication Data
US 2019/0391322 A1 Dec. 26, 2019

(30) Foreign Application Priority Data
Mar. 17, 2017 (CN) .......................... 2017 1 0159868

(51) Int. Cl.
G02F 1/13357 (2006.01)
G02F 1/1335 (2006.01)
F21V 8/00 (2006.01)

(52) U.S. Cl.
CPC ......... *G02B 6/0088* (2013.01); *G02B 6/0055* (2013.01); *G02B 6/0085* (2013.01)

(58) Field of Classification Search
CPC ................ G02B 6/0088; G02B 6/0055; G02F 2001/113628; G02F 1/133308
See application file for complete search history.

(56) References Cited

U.S. PATENT DOCUMENTS

2007/0171353 A1* 7/2007 Hong ................ G02F 1/133603
349/161
2013/0010228 A1 1/2013 Hsiao et al.
2014/0028949 A1 1/2014 Kuo et al.
(Continued)

FOREIGN PATENT DOCUMENTS

CN 101614352 A 12/2009
CN 102230588 A 11/2011
(Continued)

*Primary Examiner* — Karabi Guharay
(74) *Attorney, Agent, or Firm* — Soroker Agmon Nordman

(57) ABSTRACT

The present disclosure provides a backlight module and liquid crystal display device, comprising: a plastic frame; a reflector sheet; a light-guiding plate; a light source assembly; and a heat-dissipating member disposed at bottom of the reflector sheet and extending along a side surface of the reflector sheet to the edge of the liquid crystal panel so as to bond the backlight module to the liquid crystal panel, wherein the heat-dissipating member is fixedly bonded to the edge of the liquid crystal panel.

20 Claims, 3 Drawing Sheets

(56) References Cited

U.S. PATENT DOCUMENTS

| | | | | |
|---|---|---|---|---|
| 2014/0240639 A1* | 8/2014 | Jung | ................ | G02F 1/133615 349/60 |
| 2015/0309354 A1* | 10/2015 | Li | ....................... | G02B 6/0088 349/60 |
| 2016/0320642 A1 | 11/2016 | You et al. | | |

FOREIGN PATENT DOCUMENTS

| | | |
|---|---|---|
| CN | 102809132 A | 12/2012 |
| CN | 104913243 A | 9/2015 |
| CN | 205037083 U | 2/2016 |
| WO | 2012063666 A1 | 5/2012 |

* cited by examiner

BACKLIGHT MODULE AND LIQUID CRYSTAL DISPLAY DEVICE

FIELD OF THE DISCLOSURE

The present disclosure relates to the field of liquid crystal displays, and more particularly to a backlight module and liquid crystal display device.

BACKGROUND

Recently, the liquid crystal devices have become more popular than before. People are also getting picky in the clarity of the liquid crystal display devices. However, with rise of clarity of the liquid crystal display devices, heat dissipation of the liquid crystal display devices has gradually become a notable problem.

In the existing liquid crystal display devices, generally, a heat-dissipating member is disposed at bottom of the reflector sheet of the backlight module in order to dissipate heat released from the chip of the liquid crystal display device and dissipate heat released from the light source assembly of the backlight module. However, the heat-dissipating member is fixedly adhered to the reflector sheet by an adhesive material, and thus when the liquid crystal display devices proceed with heat dissipation, it is liable to result in fluctuation of the backlight module due to differences of the expansion/shrinkage rates among the heat-dissipating member, the reflector sheet, and the adhesive material.

Accordingly, there is a need for providing a backlight module and liquid crystal display device to solve the above-mentioned problems in the existing techniques.

SUMMARY OF THE DISCLOSURE

An object of the present disclosure is to provide a backlight module and liquid crystal display device, so as to solve the problem of fluctuation of the backlight module due to differences of the expansion/shrinkage rates among the heat-dissipating member, the reflector sheet, and the adhesive material.

The present disclosure provides a backlight module used to fix a liquid crystal panel, the backlight module comprising:

a plastic frame;

a reflector sheet disposed on a bottom surface of the plastic frame;

a light-guiding plate disposed on the reflector sheet;

a light source assembly disposed at an inner side surface of the plastic frame; and a heat-dissipating member disposed at bottom of the reflector sheet and extending along a side surface of the reflector sheet to the edge of the liquid crystal panel so as to bond the backlight module to the liquid crystal panel, wherein the heat-dissipating member is fixedly bonded to the edge of the liquid crystal panel;

the heat-dissipating member comprises an attaching portion, as well as a first bonding portion, a second bonding portion, a third bonding portion, and a fourth bonding portion disposed at the periphery of the attaching portion, wherein the attaching portion is attached to the reflector sheet by the first bonding portion, the second bonding portion, the third bonding portion, and the fourth bonding portion through the bonding fixed effect thereof;

the heat-dissipating member is a graphite sheet or a copper/aluminum foil.

In the backlight module of the present disclosure, a light-shielding material is disposed at the overlapped portion of the heat-dissipating member and the edge of the liquid crystal panel.

In the backlight module of the present disclosure, a bending line is disposed at the boundary between each of the first bonding portion the second bonding portion, the third bonding portion, and the fourth bonding portion and the attaching portion.

In the backlight module of the present disclosure, the first bonding portion, the second bonding portion, the third bonding portion, and the fourth bonding portion are adhered to the edge of the liquid crystal panel.

In the backlight module of the present disclosure, the plastic frame comprises a first frame and a second frame disposed opposite each other, and a third frame and a fourth frame used to connect the first frame and the second frame.

In the backlight module of the present disclosure, the plastic frame comprises a first frame and a second frame disposed opposite each other.

The present disclosure further provides a backlight module used to fix a liquid crystal panel, the backlight module comprising:

a plastic frame;

a reflector sheet disposed on a bottom surface of the plastic frame;

a light-guiding plate disposed on the reflector sheet;

a light source assembly disposed at an inner side surface of the plastic frame; and a heat-dissipating member disposed at bottom of the reflector sheet and extending along a side surface of the reflector sheet to the edge of the liquid crystal panel so as to bond the backlight module to the liquid crystal panel, wherein the heat-dissipating member is fixedly bonded to the edge of the liquid crystal panel.

In the backlight module of the present disclosure, a light-shielding material is disposed at the overlapped portion of the heat-dissipating member and the edge of the liquid crystal panel.

In the backlight module of the present disclosure, the heat-dissipating member comprises an attaching portion, as well as a first bonding portion, a second bonding portion, a third bonding portion, and a fourth bonding portion disposed at the periphery of the attaching portion, wherein the attaching portion is attached to the reflector sheet by the first bonding portion, the second bonding portion, the third bonding portion, and the fourth bonding portion through the bonding fixed effect thereof.

In the backlight module of the present disclosure, a bending line is disposed at the boundary between each of the first bonding portion the second bonding portion, the third bonding portion, and the fourth bonding portion and the attaching portion.

In the backlight module of the present disclosure, the first bonding portion, the second bonding portion, the third bonding portion, and the fourth bonding portion are adhered to the edge of the liquid crystal panel.

In the backlight module of the present disclosure, the heat-dissipating member is a graphite sheet or a copper/aluminum foil.

In the backlight module of the present disclosure, the plastic frame comprises a first frame and a second frame disposed opposite each other, and a third frame and a fourth frame used to connect the first frame and the second frame.

In the backlight module of the present disclosure, the plastic frame comprises a first frame and a second frame disposed opposite each other.

According to the aforesaid object of the present disclosure, the present disclosure further provides a liquid crystal display device comprising a backlight module and a liquid crystal panel fixed on the backlight module, the backlight module comprising:

a plastic frame;

a reflector sheet disposed on a bottom surface of the plastic frame;

a light-guiding plate disposed on the reflector sheet;

a light source assembly disposed at an inner side surface of the plastic frame; and a heat-dissipating member disposed at bottom of the reflector sheet and extending along a side surface of the reflector sheet to the edge of the liquid crystal panel so as to bond the backlight module to the liquid crystal panel, wherein the heat-dissipating member is fixedly bonded to the edge of the liquid crystal panel.

In the liquid crystal display of the present disclosure, the heat-dissipating member comprises an attaching portion, as well as a first bonding portion, a second bonding portion, a third bonding portion, and a fourth bonding portion disposed at the periphery of the attaching portion, wherein the attaching portion is attached to the reflector sheet by the first bonding portion, the second bonding portion, the third bonding portion, and the fourth bonding portion through the bonding fixed effect thereof.

In the liquid crystal display of the present disclosure, a bending line is disposed at the boundary between each of the first bonding portion the second bonding portion, the third bonding portion, and the fourth bonding portion and the attaching portion.

In the liquid crystal display of the present disclosure, the first bonding portion, the second bonding portion, the third bonding portion, and the fourth bonding portion are adhered to the edge of the liquid crystal panel.

In the liquid crystal display of the present disclosure, the heat-dissipating member is a graphite sheet or a copper/aluminum foil.

In the liquid crystal display of the present disclosure, a light-shielding material is disposed at the overlapped portion of the heat-dissipating member and the edge of the liquid crystal panel.

In the backlight module and liquid crystal display device of the present disclosure, the backlight module is bonded to the liquid crystal panel by disposing the heat-dissipating member at bottom of the reflector sheet and extending the heat-dissipating member along a side surface of the reflector sheet to the edge of the liquid crystal panel so as to fixedly bond the heat-dissipating member to the edge of the liquid crystal panel, so that there is not any adhesive material between the heat-dissipating member and the reflector sheet, and thus the risk that fluctuation of the backlight module due to differences of the expansion/shrinkage rates among the adhesive material, the reflector sheet, and the heat-dissipating member is avoided, and the stability of the backlight module is enhanced.

To allow the above description of the present disclosure to be more clear and comprehensive, there are preferred embodiments with the accompanying figures described in detail below.

BRIEF DESCRIPTION OF THE DRAWINGS

In view of the accompanying drawings and detailed description of the preferred embodiments, the technical and other advantageous effects of the present disclosure will be evident, in which.

DETAILED DESCRIPTION

To further explain the technical means adopted by the present disclosure and the advantageous effects generated thereby, a detailed description is provided below with reference to the preferred embodiments and the accompanying drawings. However, the illustrated embodiments are just a part of those of the present disclosure, instead of all of them. The scope intended to be protected by the present disclosure includes other embodiments obtained by any person having ordinary skill in the art without labor for inventiveness.

The following embodiments refer to the accompanying drawings for exemplifying specific implementable embodiments of the present disclosure. Moreover, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto.

Figure 1:
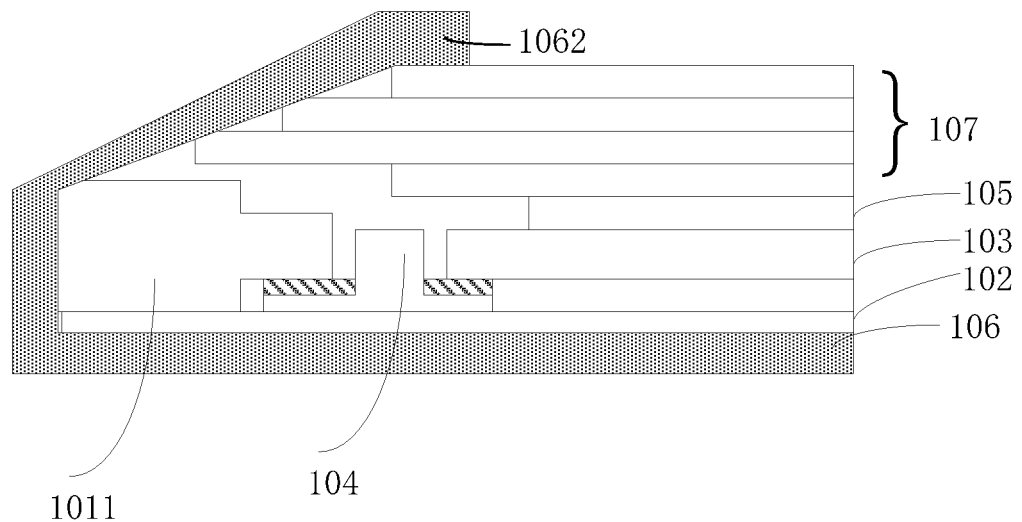
FIG. 1 is a schematic diagram showing a first structure of the backlight module according to a preferred embodiment of the present disclosure.
Figure 2:
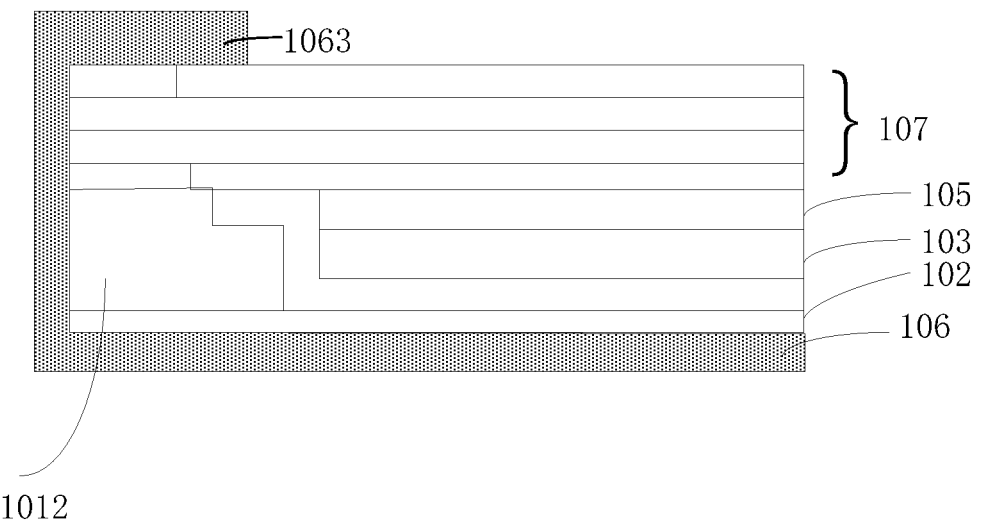
FIG. 2 is a schematic diagram showing a second structure of the backlight module according to a preferred embodiment of the present disclosure.
Figure 3:
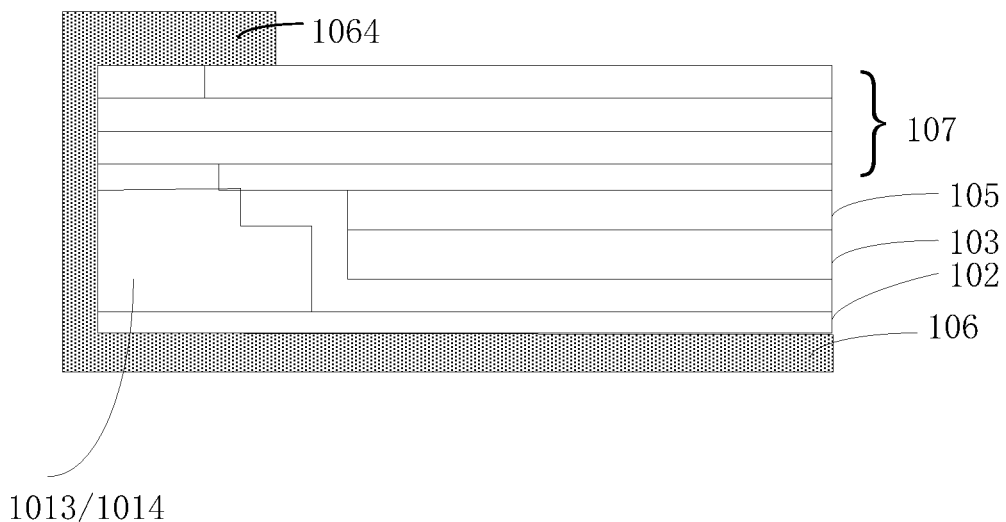
FIG. 3 is a schematic diagram showing a third structure of the backlight module according to a preferred embodiment of the present disclosure.
Figure 4:
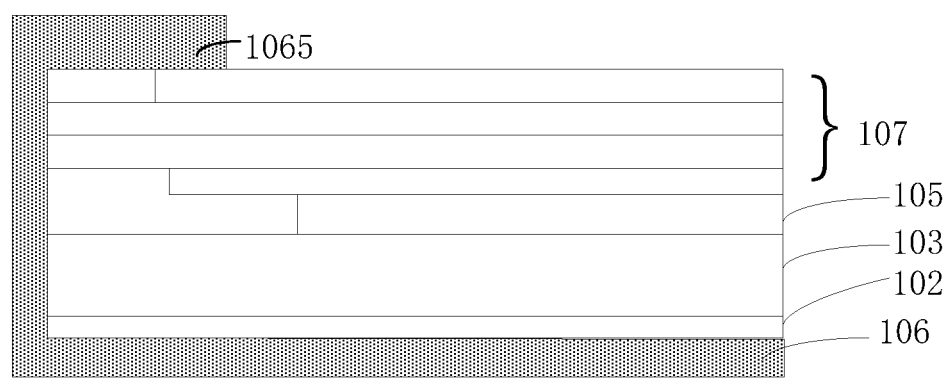
FIG. 4 is a schematic diagram showing a fourth structure of the backlight module according to a preferred embodiment of the present disclosure.

Please refer to FIGS. 1 and 2. FIG. 1 is a schematic diagram showing a first structure of the backlight module according a preferred embodiment of the present disclosure. FIG. 2 is a schematic diagram showing a second structure of the backlight module according a preferred embodiment of the present disclosure. FIG. 3 is a schematic diagram showing a third structure of the backlight module according a preferred embodiment of the present disclosure. FIG. 4 is a schematic diagram showing a fourth structure of the backlight module according a preferred embodiment of the present disclosure. It could be understood that FIG. 1 is a schematic diagram showing a structure at one side of the backlight module where the light source is located, FIG. 2 is a schematic diagram showing a structure at the other side of the backlight module which is opposite the light source, FIG. 3 is a schematic diagram showing a first structure of two sides between one side where the light source is located and said the other side, and FIG. 4 is a schematic diagram showing a second structure of two sides between one side where the light source is located and said the other side.

By combining the structures shown in FIGS. 1, 2, and 3, the backlight module of this preferred embodiment includes: a plastic frame, a reflector sheet 102, a light-guiding plate 103, a light source assembly 104, an optical film assembly 105, and a heat-dissipating member 106. The plastic frame includes a first frame 1011 and a second frame 1012 disposed opposite each other, and a third frame 1013 and a fourth frame 1014 used to connect the first frame 1011 and the second frame 1012 and disposed opposite each other. The reflector sheet 102 is disposed at a bottom surface of the plastic frame. The light-guiding plate 103 is disposed on the reflector sheet 102. The light source assembly 104 is disposed at an inner side surface of the plastic frame. The heat-dissipating member 106 is disposed at bottom of the reflector sheet 102, and extends along a side surface of the reflector sheet 102 to the edge of the liquid crystal panel 107 so as to bond the backlight module to the liquid crystal panel 107. The heat-dissipating member 106 is fixedly bonded to the edge of the liquid crystal panel 107.

Specifically, the reflector sheet is disposed on the bottom surfaces of the first frame 1011, the second frame 1012, the third frame 1013, and the fourth frame 1014, and is joined thereto by an adhesive layer (not shown). The optical film assembly 105 is disposed above the light-guiding plate 103, and is joined to the light source assembly and the plastic frame in order by an adhesive layer (not shown). The light source assembly 104 is disposed at an inner side surface of the first frame 1011, and is fixed between the plastic frame and the light-guiding plate 103 by the adhesive layer. Any person having ordinary skill in the art can appreciate that the adhesive layers used to fix the light source assembly and the optical film assembly generally use double-sided adhesive or double-sided shading glue having a thickness and a material that are well-known for the persons having ordinary skill in the art.

Figure 5:
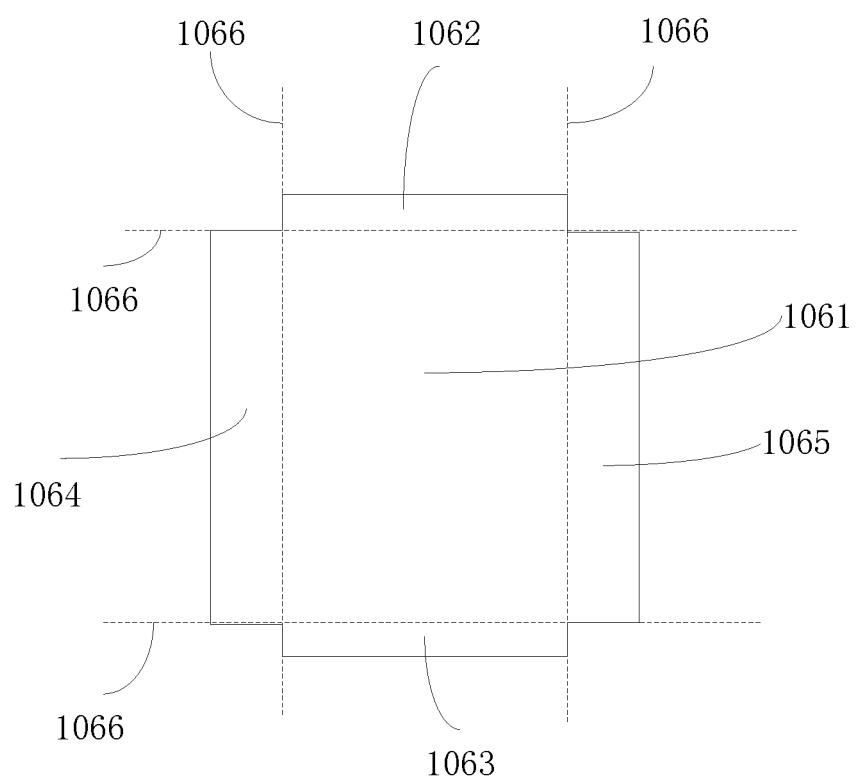
FIG. 5 is a schematic diagram showing structurally a heat-dissipating member of the backlight module according to a preferred embodiment of the present disclosure.

Refer to FIG. 5, which is a schematic diagram showing structurally a heat-dissipating member of the backlight module according to a preferred embodiment of the present disclosure. In this preferred embodiment, the heat-dissipating member 106 includes an attaching portion 1061, as well as a first bonding portion 1062, a second bonding portion 1063, a third bonding portion 1064, and a fourth bonding portion 1065 disposed at the periphery of the attaching portion 1061. The attaching portion 1061 is attached to the reflector sheet 102 by the first bonding portion 1062, the second bonding portion 1063, the third bonding portion 1064, and the fourth bonding portion 1065 through the bonding fixed effect thereof, such that fluctuation of the backlight module resulted from differences of the expansion/shrinkage rates among the heat-dissipating member 106, the reflector sheet 102, and the adhesive material can be avoided.

A bending line 1066 is disposed between each of the first bonding portion 1062, the second bonding portion 1063, the third bonding portion 1064, and the fourth bonding portion 1065 and the attaching portion 1061, thereby the operators, when assembling the module, can easily install the heat-dissipating member 106 based on the bending lines 1066.

Further, the backlight module according to this preferred embodiment can also result in a light-shielding effect by disposing a light-shielding material at the overlapped portion of the heat-dissipating member 106 and the edge of the liquid crystal panel 107, and thus omit the light-shielding glue used in existing backlight modules. Specifically, a light-shielding material is disposed on all of the first bonding portion 1062, the second bonding portion 1063, the third bonding portion 1064, and the fourth bonding portion 1065, and the first bonding portion 1062, the second bonding portion 1063, the third bonding portion 1064, and the fourth bonding portion 1065 are adhered to the edge of the liquid crystal panel.

Preferably, the heat-dissipating member 106 of the backlight module of the present disclosure is a graphite sheet or a copper/aluminum foil.

On the other hand, by combining the structures shown in FIGS. 1, 2, and 4, the plastic frame of this preferred embodiment can be alternatively configured to have a structure as described below. The plastic frame includes a first frame 1011 and a second frame 1012 disposed opposite each other, wherein the frames between the first frame 1011 and the second frame 1012 are omitted. Since the heat-dissipating member 106 wraps around the entire backlight module and even if the frames between the first frame 1011 and the second frame 1012 are omitted, the entire backlight module can be solidified tightly. In this way, the liquid crystal display can not only achieve the purpose of heat dissipation but also can be designed to have the advantage of narrow frames.

In the backlight module of this preferred embodiment, the backlight module is bonded to the liquid crystal panel by disposing the heat-dissipating member at bottom of the reflector sheet and extending the heat-dissipating member along a side surface of the reflector sheet to the edge of the liquid crystal panel so as to fixedly bond the heat-dissipating member to the edge of the liquid crystal panel, so that there is not any adhesive material between the heat-dissipating member and the reflector sheet, and thus the risk that fluctuation of the backlight module due to differences of the expansion/shrinkage rates among the adhesive material, the reflector sheet, and the heat-dissipating member is avoided, and the stability of the backlight module is enhanced.

The present disclosure further provides a liquid crystal display device including a backlight module and a liquid crystal panel fixed on the backlight module. The backlight module includes: a plastic frame, a reflector sheet disposed on a bottom surface of the plastic frame, a light-guiding plate disposed on the reflector sheet, a light source assembly disposed at an inner side surface of the plastic frame, and a heat-dissipating member disposed at bottom of the reflector sheet and extending along a side surface of the reflector sheet to the edge of the liquid crystal panel so as to bond the backlight module to the liquid crystal panel, wherein the heat-dissipating member is fixedly bonded to the edge of the liquid crystal panel.

Preferably, a light-shielding material is disposed at the overlapped portion of the heat-dissipating member and the edge of the liquid crystal panel.

Preferably, the heat-dissipating member includes an attaching portion, as well as a first bonding portion, a second bonding portion, a third bonding portion, and a fourth bonding portion, wherein the attaching portion is attached to the reflector sheet by the first bonding portion, the second bonding portion, the third bonding portion, and the fourth bonding portion through the bonding fixed effect thereof.

Preferably, a bending line is disposed at the boundary between each of the first bonding portion the second bonding portion, the third bonding portion, and the fourth bonding portion and the attaching portion.

Preferably, the first bonding portion, the second bonding portion, the third bonding portion, and the fourth bonding portion are adhered to the edge of the liquid crystal panel.

Preferably, the heat-dissipating member is a graphite sheet or a copper/aluminum foil.

Preferably, the plastic frame includes a first frame and a second frame disposed opposite each other, and a third frame and a fourth frame used to connect the first frame and the second frame.

Preferably, the plastic frame includes a first frame and a second frame disposed opposite to each other.

In the backlight module and liquid crystal display device of the present disclosure, the backlight module is bonded to the liquid crystal panel by disposing the heat-dissipating member at bottom of the reflector sheet and extending the heat-dissipating member along a side surface of the reflector sheet to the edge of the liquid crystal panel so as to fixedly bond the heat-dissipating member to the edge of the liquid crystal panel, so that there is not any adhesive material between the heat-dissipating member and the reflector sheet, and thus the risk that fluctuation of the backlight module due to differences of the expansion/shrinkage rates among the adhesive material, the reflector sheet, and the heat-dissipating member is avoided, and the stability of the backlight module is enhanced.

In summary, while the present disclosure has been described with the aforementioned preferred embodiments, it is preferable that the specifications relating to the above embodiments should be construed as exemplary rather than as limiting of the present disclosure. One of ordinary skill in the art can make a variety of modifications and variations without departing from the spirit and scope of the present disclosure as defined by the following claims.

What is claimed is:

1. A backlight module used to fix a liquid crystal panel, the backlight module comprising:
 a plastic frame;
 a reflector sheet disposed on a bottom surface of the plastic frame;
 a light-guiding plate disposed on the reflector sheet;
 a light source assembly disposed at an inner side surface of the plastic frame; and
 a heat-dissipating member disposed at bottom of the reflector sheet and extending along a side surface of the reflector sheet to an edge of the liquid crystal panel so as to bond the backlight module to the liquid crystal panel, wherein the heat-dissipating member is fixedly bonded to the edge of the liquid crystal panel;
 the heat-dissipating member comprising an attaching portion, as well as a first bonding portion, a second bonding portion, a third bonding portion, and a fourth bonding portion disposed at the periphery of the attaching portion, wherein the attaching portion is attached to the reflector sheet by the first bonding portion, the second bonding portion, the third bonding portion, and the fourth bonding portion through the bonding fixed effect thereof, and the attaching portion, the first bonding portion, the second bonding portion, the third bonding portion, and the fourth bonding portion comprises the same material that are integratedly formed;
 wherein the heat-dissipating member is a graphite sheet or a copper/aluminum foil.

2. The backlight module according to claim 1, wherein a light-shielding material is disposed at an overlapped portion of the heat-dissipating member and the edge of the liquid crystal panel.

3. The backlight module according to claim 1, wherein a bending line is disposed at a boundary between each of the first bonding portion, the second bonding portion, the third bonding portion, and the fourth bonding portion and the attaching portion.

4. The backlight module according to claim 1, wherein the first bonding portion, the second bonding portion, the third bonding portion, and the fourth bonding portion are adhered to the edge of the liquid crystal panel.

5. The backlight module according to claim 1, wherein the plastic frame comprises a first frame and a second frame disposed opposite each other, and a third frame and a fourth frame configured to connect the first frame and the second frame.

6. The backlight module according to claim 1, wherein the plastic frame comprises a first frame and a second frame disposed opposite each other.

7. A backlight module used to fix a liquid crystal panel, the backlight module comprising:
 a plastic frame;
 a reflector sheet disposed on a bottom surface of the plastic frame;
 a light-guiding plate disposed on the reflector sheet;
 a light source assembly disposed at an inner side surface of the plastic frame; and
 a heat-dissipating member disposed at bottom of the reflector sheet and extending along a side surface of the reflector sheet to an edge of the liquid crystal panel so as to bond the backlight module to the liquid crystal panel, wherein the heat-dissipating member is fixedly bonded to the edge of the liquid crystal panel and comprises an attaching portion, as well as a first bonding portion, a second bonding portion, a third bonding portion, and a fourth bonding portion disposed at the periphery of the attaching portion, and the attaching portion, the first bonding portion, the second bonding portion, the third bonding portion, and the fourth bonding portion comprises the same material that are integratedly formed.

8. The backlight module according to claim 7, wherein a light-shielding material is disposed at the overlapped portion of the heat-dissipating member and the edge of the liquid crystal panel.

9. The backlight module according to claim 7, wherein the attaching portion is attached to the reflector sheet by the first bonding portion, the second bonding portion, the third bonding portion, and the fourth bonding portion through the bonding fixed effect thereof.

10. The backlight module according to claim 9, wherein a bending line is disposed at the boundary between each of the first bonding portion the second bonding portion, the third bonding portion, and the fourth bonding portion and the attaching portion.

11. The backlight module according to claim 9, wherein the first bonding portion, the second bonding portion, the third bonding portion, and the fourth bonding portion are adhered to the edge of the liquid crystal panel.

12. The backlight module according to claim 7, wherein the heat-dissipating member is a graphite sheet or a copper/aluminum foil.

13. The backlight module according to claim 7, wherein the plastic frame comprises a first frame and a second frame disposed opposite each other, and a third frame and a fourth frame configured to connect the first frame and the second frame.

14. The backlight module according to claim 7, wherein the plastic frame comprises a first frame and a second frame disposed opposite each other.

15. A liquid crystal display device comprising a backlight module and a liquid crystal panel fixed on the backlight module, the backlight module comprising:
 a plastic frame;
 a reflector sheet disposed on a bottom surface of the plastic frame;
 a light-guiding plate disposed on the reflector sheet;
 a light source assembly disposed at an inner side surface of the plastic frame; and
 a heat-dissipating member disposed at bottom of the reflector sheet and extending along a side surface of the reflector sheet to the edge of the liquid crystal panel so as to bond the backlight module to the liquid crystal panel, wherein the heat-dissipating member is fixedly bonded to the edge of the liquid crystal panel and comprises an attaching portion, as well as a first bonding portion, a second bonding portion, a third bonding portion, and a fourth bonding portion disposed at the periphery of the attaching portion, and the attaching portion, the first bonding portion, the second bonding portion, the third bonding portion, and the fourth bonding portion comprises the same material that are integratedly formed.

16. The liquid crystal display device according to claim 15, wherein the attaching portion is attached to the reflector sheet by the first bonding portion, the second bonding portion, the third bonding portion, and the fourth bonding portion through the bonding fixed effect thereof.

17. The liquid crystal display device according to claim 16, wherein a bending line is disposed at the boundary between each of the first bonding portion the second bonding portion, the third bonding portion, and the fourth bonding portion and the attaching portion.

18. The liquid crystal display device according to claim 16, wherein the first bonding portion, the second bonding portion, the third bonding portion, and the fourth bonding portion are adhered to the edge of the liquid crystal panel.

19. The liquid crystal display device according to claim 15, wherein the heat-dissipating member is a graphite sheet or a copper/aluminum foil.

20. The liquid crystal display device according to claim 15, wherein a light-shielding material is disposed at the overlapped portion of the heat-dissipating member and the edge of the liquid crystal panel.

* * * * *